(12) United States Patent
Osawa et al.

(10) Patent No.: US 10,259,297 B2
(45) Date of Patent: Apr. 16, 2019

(54) VEHICLE DOOR FRAME

(71) Applicant: SHIROKI CORPORATION, Fujisawa-shi, Kanagawa (JP)

(72) Inventors: Shigenobu Osawa, Aichi (JP); Hiroaki Yamazaki, Aichi (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 23 days.

(21) Appl. No.: 15/710,065

(22) Filed: Sep. 20, 2017

(65) Prior Publication Data
US 2018/0079286 A1 Mar. 22, 2018

(30) Foreign Application Priority Data
Sep. 21, 2016 (JP) .................................. 2016-184711

(51) Int. Cl.
*B62D 25/04* (2006.01)
*B60J 5/04* (2006.01)

(52) U.S. Cl.
CPC ........... *B60J 5/0408* (2013.01); *B60J 5/0402* (2013.01)

(58) Field of Classification Search
CPC ........ E05B 37/02; F15B 15/149; F16J 15/40; F16J 1/09; F16L 23/02; B08B 15/023; B60J 5/0402; E05Y 2900/148; F24F 13/32; F24F 1/027
USPC ................................ 296/146.5, 146.2, 146.9
See application file for complete search history.

(56) References Cited

U.S. PATENT DOCUMENTS

| 5,007,201 A * | 4/1991 | D'Hoore | B60J 1/17 49/348 |
|---|---|---|---|
| 5,398,453 A * | 3/1995 | Heim | B60J 5/042 49/502 |
| 8,651,557 B2 * | 2/2014 | Suzuki | B60J 5/0401 296/146.2 |
| 8,864,213 B2 * | 10/2014 | Ohsawa | B60J 5/0402 296/146.5 |
| 10,023,029 B2 * | 7/2018 | Goto | B60J 5/0426 |
| 2003/0140566 A1 * | 7/2003 | Sommer | B60J 5/0406 49/502 |
| 2011/0302846 A1 * | 12/2011 | Okada | B60J 5/0408 49/502 |
| 2012/0192498 A1 * | 8/2012 | Fukui | B60J 5/0402 49/504 |
| 2012/0198775 A1 * | 8/2012 | Fukui | B60J 5/0402 49/504 |
| 2012/0247026 A1 * | 10/2012 | Sato | B60R 13/04 49/493.1 |
| 2013/0127196 A1 * | 5/2013 | Takeuchi | B60R 13/04 296/1.08 |

(Continued)

FOREIGN PATENT DOCUMENTS

JP 2007-137200 A 6/2007

*Primary Examiner* — Kiran B Patel
(74) *Attorney, Agent, or Firm* — Buchanan Ingersoll & Rooney PC

(57) ABSTRACT

A front door frame includes an upper sash and a lower member. The upper sash has a first end face being one flat, longitudinal end crossing a longitudinal direction, and a lower outer face. The lower member includes a second end face that abuts on the first end face, and a projection that projects along the outer face in a direction where the second end face faces, to support the upper sash. The first end face abuts on the second end face but does not abut on a tip of the projection.

4 Claims, 5 Drawing Sheets

(56) References Cited

U.S. PATENT DOCUMENTS

| | | | |
|---|---|---|---|
| 2014/0217773 A1* | 8/2014 | Shimizu | B60J 5/0402 296/146.6 |
| 2014/0339853 A1* | 11/2014 | Sato | B60J 5/0402 296/146.5 |
| 2015/0183306 A1* | 7/2015 | Shimizu | B60J 5/0411 296/146.6 |
| 2015/0352932 A1* | 12/2015 | Mildner | B60J 5/0429 296/193.05 |
| 2016/0167491 A1* | 6/2016 | Nakaguchi | B60J 5/0402 49/504 |
| 2016/0200181 A1* | 7/2016 | Sato | B23K 11/14 296/146.2 |
| 2016/0257183 A1* | 9/2016 | Yamazaki | B60J 5/0402 |
| 2017/0080525 A1* | 3/2017 | Noda | B23K 26/28 |
| 2018/0072243 A1* | 3/2018 | Eckart | B60J 5/04 |
| 2018/0079285 A1* | 3/2018 | Osawa | B60J 5/0469 |
| 2018/0117997 A1* | 5/2018 | Otake | B60J 5/0402 |
| 2018/0156578 A1* | 6/2018 | Trudeau | F41H 7/04 |
| 2018/0229670 A1* | 8/2018 | Bito | B60R 13/04 |

\* cited by examiner

VEHICLE DOOR FRAME

CROSS-REFERENCE TO RELATED APPLICATIONS

This application is based upon and claims the benefit of priority from Japanese Patent Application No. 2016-184711, filed Sep. 21, 2016, the entire contents of which are incorporated herein by reference.

FIELD

An embodiment described herein relates generally to a vehicle door frame.

BACKGROUND

Conventionally, there has been known a vehicle door frame including an upper sash and a side sash joined to each other by inserting a protrusion of the upper sash into a recess in the side sash (for example, described in Japanese Patent Application Laid-open Publication No. 2007-137200).

Such a vehicle door frame preferably has a simpler structure of different members joined under a required condition.

An exemplary object of the present invention is to provide a vehicle door frame with a simpler structure including joined members.

SUMMARY

In general, according to one embodiment, a vehicle door frame includes an upper sash and a lower member. The upper sash has a first end face and a lower outer face. The first end face is one flat, longitudinal end crossing a longitudinal direction. The lower member includes a second end face and a projection. The second end face is joined to one end of the upper sash, facing the first end face. The projection projects from the second end face in the longitudinal direction. The first end face abuts only on the second end face among a tip of the projection and the second end face. The projection supports the lower outer face from below.

In the vehicle door frame, the lower member includes a closed sectional part, an upper wall, and a lower wall. The closed sectional part includes a closed section crossing the longitudinal direction extending in the longitudinal direction. The upper wall extends in the longitudinal direction and forms a part of the closed sectional part. The lower wall extends in the longitudinal direction, forms a part of the closed sectional part, and faces the upper wall on the closed sectional part. The upper wall forms at least a part of the second end face, and is juxtaposed to the upper sash in the longitudinal direction. The lower wall includes the projection.

In the vehicle door frame, the lower member includes an outer member and an inner member. The inner member at least partially lies more inward than the outer member in a vehicle width direction and includes the upper wall and the lower wall. The inner member includes the second end face. The longitudinal end of the outer member faces the first end face with a gap therebetween.

In the vehicle door frame, the projection includes a side edge that extends in a projecting direction of the projection. The lower member includes a cutout between the second end face and the side edge. The cutout is recessed from the second end face in a direction opposite to the projecting direction.

DETAILED DESCRIPTION

Figure 1:
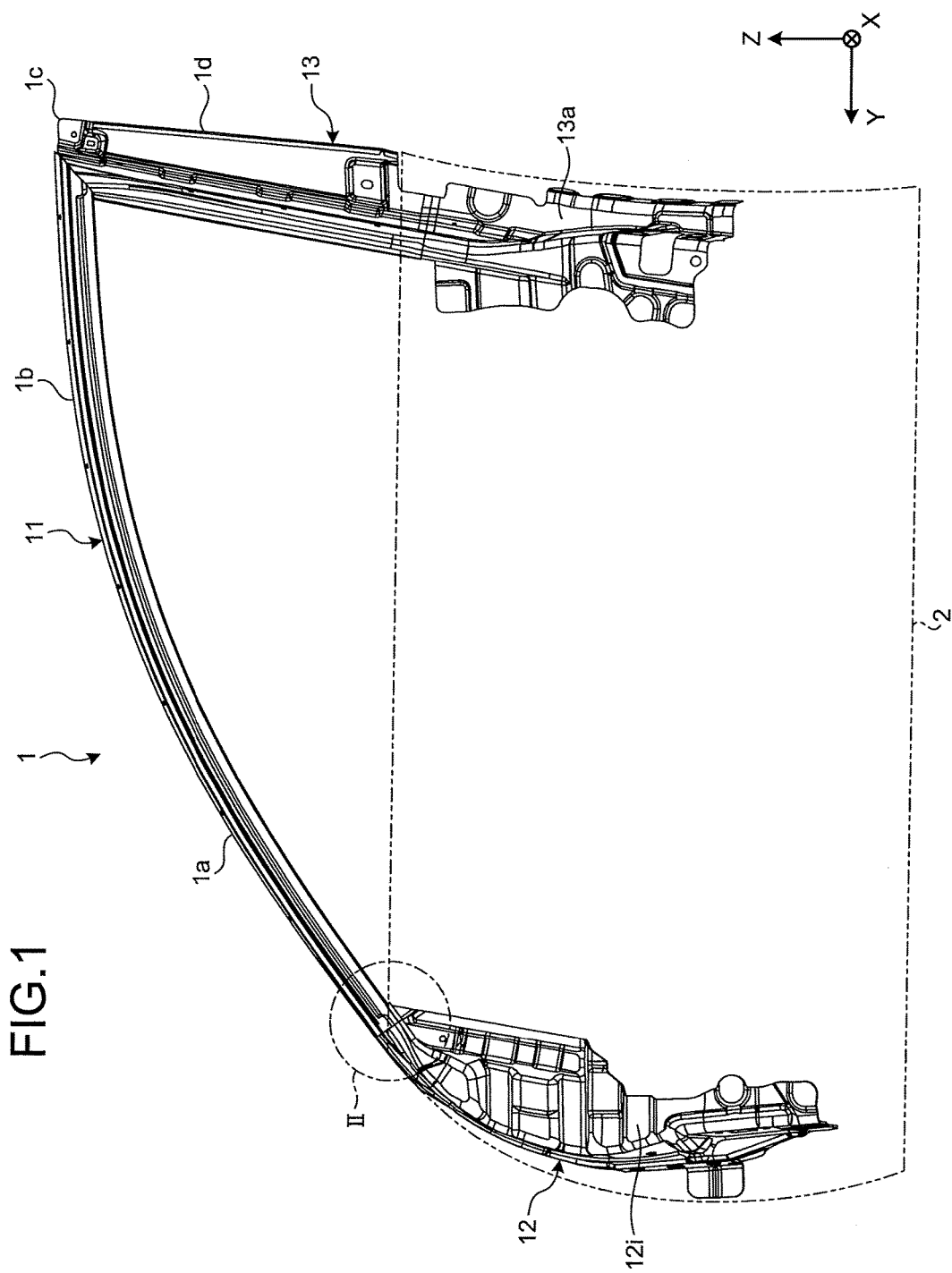
FIG. 1 is a schematic, exemplary side view illustrating a vehicle door frame according to an embodiment.

An embodiment of the present invention will now be described. The configuration of the embodiment described below, and actions and results (effects) caused by the configuration have been presented by way of example. The present invention can be achieved by configurations other than the configuration disclosed in the following embodiment. The present invention can attain at least one of the various effects (including derivative effects) by the configuration. In the specification, ordinal numerals are assigned not to represent priority or order but to distinguish between components and parts for convenience.

In the drawings, X, Y, and Z directions are defined for convenience. X, Y, and Z indicate rightward in a vehicle width direction, forward in a vehicle front-rear direction, and upward in a vehicle vertical direction, respectively.

FIG. 1 is a side view illustrating a front door frame 1 for a vehicle. As illustrated in FIG. 1, the front door frame 1 includes an upper sash 11 that forms a front edge 1a and a top edge 1b of an aperture for a window panel, a lower member 12 that forms a front bottom of the front door frame 1, and a side sash 13 that forms a rear edge 1d of the aperture. The front door frame 1 is an example of the vehicle door frame.

The upper sash 11, the lower member 12, and the side sash 13 are formed of, for example, an aluminum alloy and a metal material such as an iron material. The upper sash 11 can be formed by, for example, aluminum alloy extrusion. The lower member 12 and the side sash 13 can be formed by, for example, bending and joining metal plates but may be a cast component.

The front edge (bottom edge) of the upper sash 11 and the top edge (rear edge) of the lower member 12 are joined by welding, for example. The upper sash 11 and the side sash 13 are joined in a top corner 1c by welding, for example.

The lower member 12 and the side sash 13 are provided with fixtures 12i and 13a at their bottom parts, respectively. These fixtures 12i and 13a are joined to a door panel 2 by welding, for example. The fixtures 12i and 13a are also referred to as brackets. The fixtures 12i and 13a work to enhance the rigidity and strength of the door panel 2. Thus, the fixtures 12i and 13a are also referred to as reinforcements.

Figure 2:
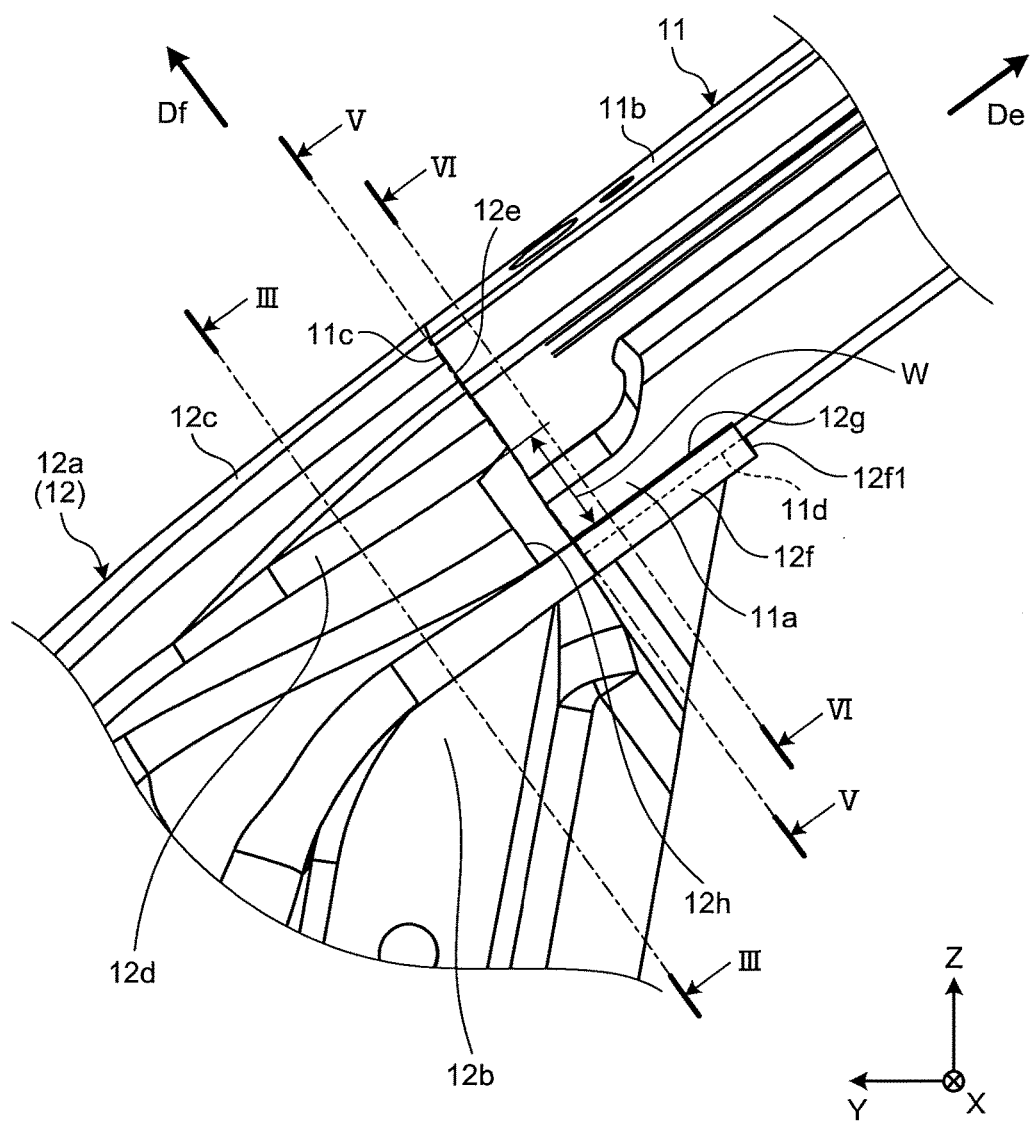
FIG. 2 is an enlarged view of a part indicated by the Roman numeral II in FIG. 1.

FIG. 2 is an enlarged view of the part indicated by the Roman numeral II in FIG. 1, in other words, a connection (joint) between the upper sash 11 and the lower member 12. As illustrated in FIG. 2, the upper sash 11 extends in a direction De, that is, rearward and upward. The direction De can be referred to as a longitudinal direction or an extending direction of the upper sash 11.

An end face 11c of the upper sash 11 and an end face 12e of the lower member 12 abut on and are joined to each other. The end faces 11c and 12e extend in a direction Df crossing the direction De, for example, approximately orthogonal to the direction De. The end face 11c is an example of a first end face, and the end face 12e is an example of a second end face.

A lower outer face 11d of the upper sash 11 is supported by a projection 12f projecting from the lower member 12 in the direction De. In other words, the projection 12f projects in the direction De along the outer face 11d.

Figure 3:
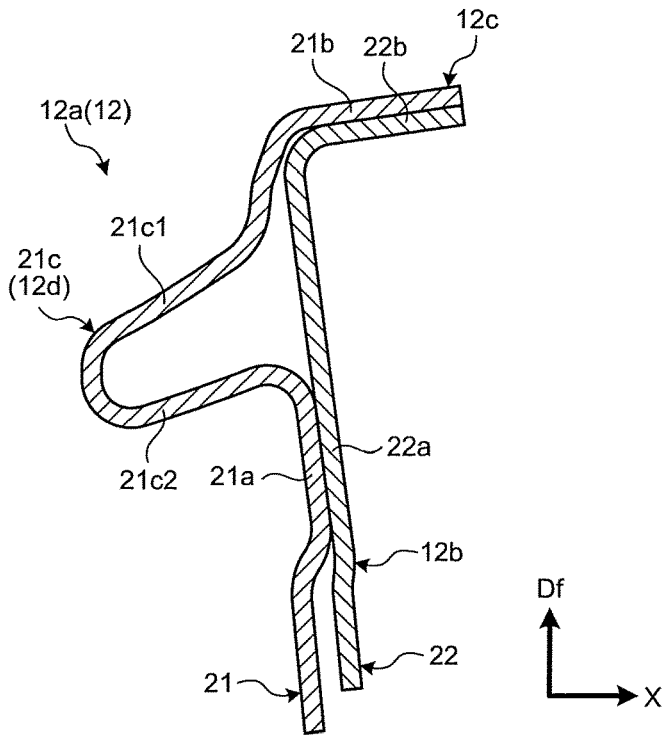
FIG. 3 is a sectional view of FIG. 2 along line III-III.

FIG. 3 is a sectional view of FIG. 2 along line III-III. The lower member 12 includes a closed section 12a as illustrated in FIG. 3. The lower member 12 includes an inner member 21 and an outer member 22. The inner member 21 and the outer member 22 are, for example, plate-shaped metal members and are bent by, for example, press-molding. A contact between the inner member 21 and the outer member 22 is joined by welding, for example, forming the closed section 12a. The closed section 12a extends in the direction De at least near the end face 12e.

The inner member 21 includes a longitudinal wall 21a, a lateral wall 21b, and a curve 21c. The longitudinal wall 21a extends in a vertical direction. The lateral wall 21b extends outward from a top end of the longitudinal wall 21a in the vehicle width direction. The curve 21c is a middle part of the longitudinal wall 21a and, for example, projects inward in the vehicle width direction. The curve 21c can be referred to as an outer projecting wall.

The curve 21c has a U-shape, and includes an upper part 21c1 on the top and a lower part 21c2 on the bottom. In the closed section 12a, the upper part 21c1 and the lower part 21c2 face each other in the vertical direction. The upper part 21c1 is an example of an upper wall, and the lower part 21c2 is an example of a lower wall.

The outer member 22 is positioned outside the inner member 21 in the vehicle width direction. The outer member 22 includes a longitudinal wall 22a and a lateral wall 22b. The longitudinal wall 22a contacts the longitudinal wall 21a of the inner member 21, and extends in the vertical direction along the longitudinal wall 21a. The lateral wall 22b extends outward from a top end of the longitudinal wall 22a in the vehicle width direction. The lateral wall 22b contacts the lateral wall 21b of the inner member 21, and extends along the lateral wall 21b.

At least a part of the inner member 21 lies inside the outer member 22 in the vehicle width direction. The longitudinal wall 21a of the inner member 21 and the longitudinal wall 22a of the outer member 22 form a longitudinal wall 12b of the lower member 12, the lateral wall 21b of the inner member 21 and the lateral wall 22b of the outer member 22 form a lateral wall 12c of the lower member 12, and the curve 21c of the inner member 21 forms a curve 12d of the lower member 12.

Figure 4:
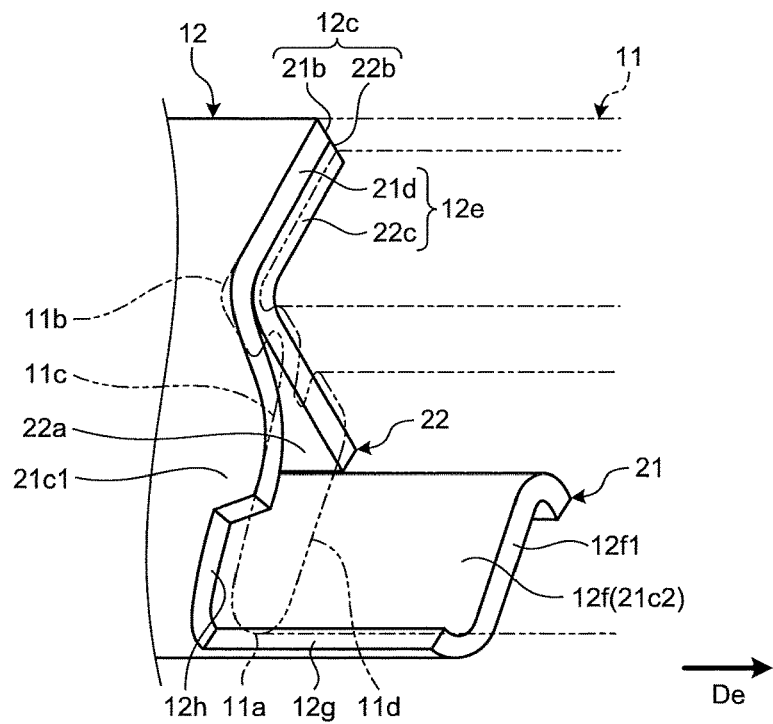
FIG. 4 is a schematic, exemplary perspective view of a longitudinal end of a lower member according to the embodiment.
Figure 5:
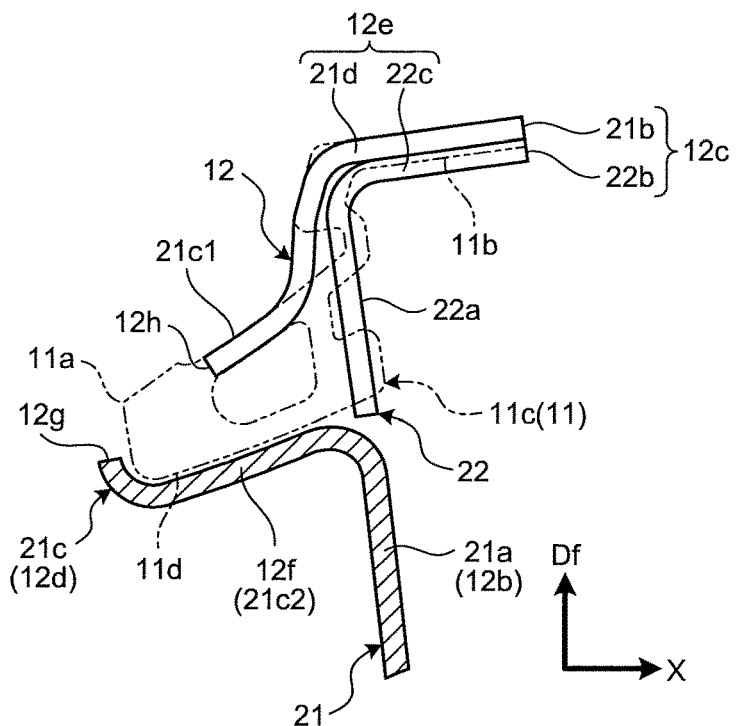
FIG. 5 is a sectional view of FIG. 2 along line V-V.
Figure 6:
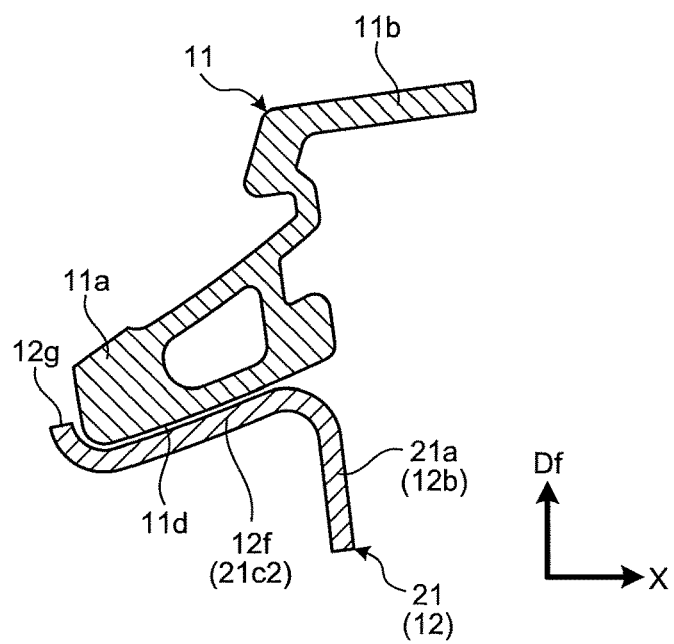
FIG. 6 is a sectional view of FIG. 2 along line VI-VI.

FIG. 4 is a perspective view illustrating an end of the lower member 12, including the end face 12e. FIG. 5 is a sectional view of FIG. 2 along line V-V. In other words, FIG. 5 is a sectional view of the upper sash 11 and the lower member 12 along the end face 12e. FIG. 6 is a sectional view of FIG. 2 along line VI-VI.

As illustrated in FIG. 4, the lower member 12 includes the end face 12e that abuts on the end face 11c of the upper sash 11. The end face 11c and the end face 12e are joined to each other by welding, for example.

As illustrated in FIGS. 4 and 5, the end face 12e includes an end 21d of the inner member 21 and an end 22c of the outer member 22. The end 21d is an end of the lateral wall 21b and the upper part 21c1. The end 22c is an end of the longitudinal wall 22a and the lateral wall 22b. The end 21d and the end 22c are planar and extend on the same plane along the direction Df. The end face 12e is, for example, approximately orthogonal to the direction De.

As illustrated in FIG. 6, the upper sash 11 includes a closed section 11a and a lateral wall 11b that projects upward from the closed section 11a and extends outward in the vehicle width direction.

As illustrated in FIG. 4, the end face 11c of the upper sash 11 is flat in the direction Df. The end face 11c is, for example, approximately orthogonal to the direction De.

As illustrated in FIG. 4, the lower part 21c2 of the curve 21c is provided with the projection 12f that projects in the direction De, in other words, in the direction where the end face 12e faces. The projection 12f substantially contacts the lower outer face 11d of the upper sash 11, and projects in the direction De along the outer face 11d. As illustrated in FIGS. 4 to 6, the projection 12f supports the upper sash 11 from below.

As is clear from FIG. 4, the upper part 21c1 continues up to the end face 12e (end part 21d), and is therefore not present in the area of the projection 12f. The upper part 21c1 of the curve 21c is juxtaposed to the closed section 11a of the upper sash 11 in the direction De, and the lower part 21c2 of the curve 21c is juxtaposed to the closed section 11a in a direction crossing the direction De, for example, in the vertical direction. The end face 12e does not face a tip 12f1 of the projection 12f.

As illustrated in FIGS. 4 and 5, a cutout 12h is provided to a corner between a side edge 12g along the direction De of the projection 12f (in other words, a projecting direction of the projection 12f) and the end surface 12e. The cutout 12h is recessed in a direction opposite to the direction De, in other words, opposite to a projecting direction of the projection 12f from the end face 12e. As illustrated in FIG. 2, a width W of the cutout 12h is gradually widened in the direction De.

Figure 7:
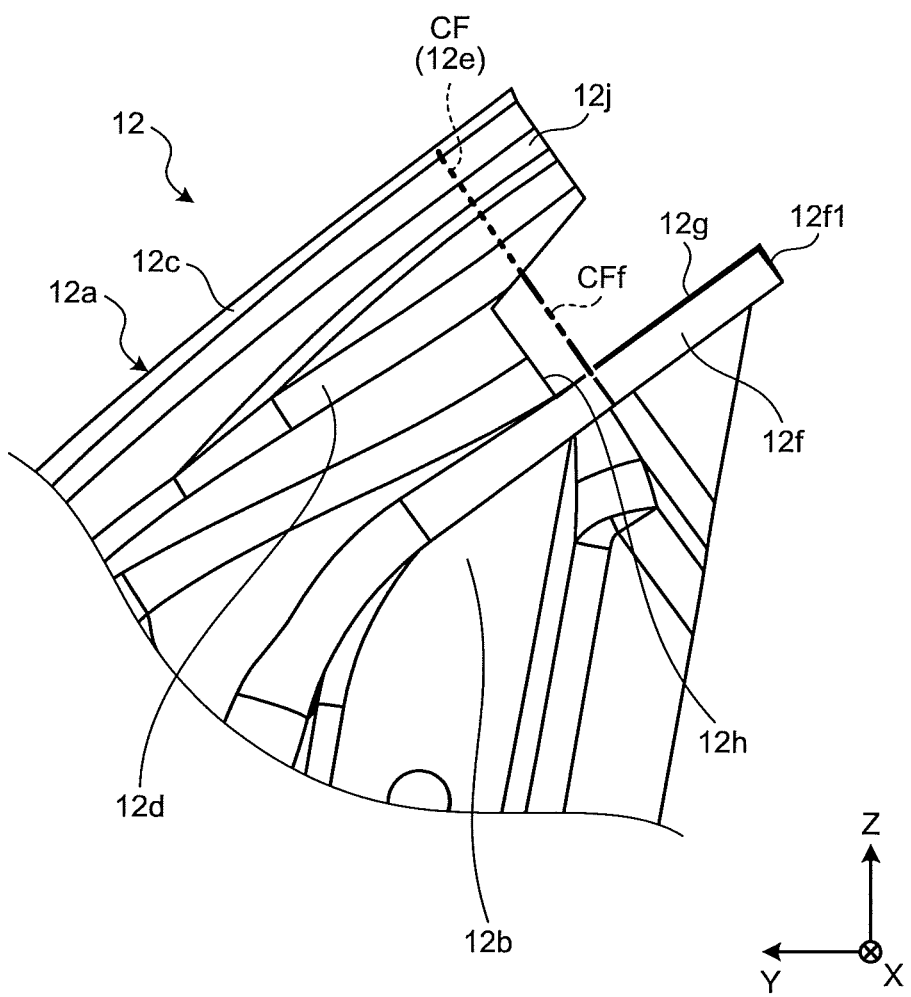
FIG. 7 is a schematic, exemplary side view of the lower member according to the embodiment without a second end face, as viewed from the same position as that in FIG. 2.

FIG. 7 is a side view illustrating the lower member 12 without the end face 12e, as viewed from the same position as that in FIG. 2. As illustrated in FIG. 7, the end face 12e can be formed by cutting off, along a cut plane CF, a tip end 12j of the lower member 12 opposite the projection 12f across the cutout 12h, in other words, tip ends of the lateral wall 21b and the curve 21c.

The end face 12e formed by press-molding may be slightly bent through a bending process or a joining process after the press-molding. In addition, an individual difference may occur in the flatness of the end faces 12e. It is difficult to maintain the accuracy of the end face 12e in consideration of deformation caused by such a post process and variation in the deformation. By contrast, cutting off the tip end 12j can be implemented in the last stage of a manufacturing process of the lower member 12 so as to maintain the flatness of the end face 12e or the cut plane CF.

However, without the cutout 12h, it is difficult to set the target position of a cutting tool (not illustrated) that moves downward from the opposite side of the projection 12f, that is, from the upper left to the lower right in FIG. 7, and, as indicated by the two-dot chain line CFf in FIG. 7, the cut plane CF may reach the projection 12f, damaging the projection 12f.

Meanwhile, according to the embodiment, the motion of the cutting tool can be easily stopped upon reaching the cutout 12h, thereby preventing the projection 12f from being damaged. In other words, according to the embodiment, owing to the cutout 12h, a more accurate end face 12e can be more imply obtained by cutting off the tip end 12j.

As described above, in the embodiment, one longitudinal end of the upper sash 11 in the direction De (longitudinal direction) is the end face 11c (first end face) being flat along the direction Df crossing the direction De (longitudinal direction). The lower member 12 includes the end face 12e (second end face) that abuts on the end face 11c and the projection 12f that projects in the direction where the end face 12e faces, to support the upper sash 11. The tip 12f1 of the projection 12f and the lower outer face 11d of the upper sash 11 are joined to each other by metal inert gas (MIG) welding or tungsten inert gas (TIG) welding. The end face 12e abuts only on the end face 11c and does not abut on the tip 12f1 of the projection 12f. Thus, according to the embodiment, for example, it is possible to attain the front door frame 1 with a simpler structure including the upper sash 11 and the lower member 12 joined with proper positioning precision.

In the embodiment, the upper part 21c1 (upper wall) of the curve 21c is juxtaposed to the closed section 11a of the upper sash 11 in the direction De (longitudinal direction), and the lower part 21c2 (lower wall) is juxtaposed to the closed section 11a of the upper sash 11 in the direction crossing the direction De, for example, the vertical direction. The lower part 21c2 includes the projection 12f. In other words, in the embodiment, the closed section 11a of the upper sash 11 is not sandwiched between the upper part 21c1 and the lower part 21c2 facing each other, but the lower part 21c2 supports the closed section 11a of the upper sash 11 in the direction (direction Df) crossing the direction De, and the upper part 21c1 is not present on the opposite side of the lower part 21c2 across the closed section 11a. If the closed section 11a is sandwiched between the upper part 21c1 and the lower part 21c2, the curve 21c needs to be shaped with higher accuracy. In this respect, according to the embodiment the closed section 11a is not sandwiched between the upper part 21c1 and the lower part 21c2, therefore, the manufacturing time and costs of the lower member 12 and the front door frame 1 can be further reduced from those when the closed section 11a is sandwiched between the upper part 21c1 and the lower part 21c2. In addition, in the embodiment, the area of the closed section 11a can be enlarged from that of the one sandwiched between the upper part 21c1 and the lower part 21c2, enhancing the rigidity and strength of the upper sash 11.

In the embodiment, the lower part 12 includes the cutout 12h that is recessed from the end face 12e (second end face) oppositely to the extending direction of the projection 12f. Thus, according to the embodiment, a cutting tool can be easily stopped at the cutout 12h, which makes it possible to more simply, more accurately obtain the end face 12e by cutting off the tip end 12j without damaging the projection 12f.

In the embodiment, the width W of the cutout 12h is widened in the direction De (projecting direction). Thus, according to the embodiment, the mold of the cutout 12h for press-molding can be widened, which can elongate the longevity of the mold.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, the end 22c of the outer member 22 may be further retracted than the end 21d of the inner member 21 so as to face the end face 11c of the upper sash 11 with a gap therebetween. In this case, for example, surface accuracy (flatness) of the end 22c can be lowered, reducing the manufacturing time and costs.

The vehicle door frame includes the upper sash having one longitudinal end being flat and a lower member, which can be connected to each other. It is thus possible to provide the vehicle door frame with a simpler structure of different members joined to each other.

What is claimed is:

1. A vehicle door frame comprising:
an upper sash that has a first end face and a lower outer face, the first end face being one flat, longitudinal end crossing a longitudinal direction; and
a lower member that includes a second end face and a projection, the second end face being joined to one end of the upper sash, facing the first end face, the projection projecting from the second end face in the longitudinal direction, wherein
the first end face abuts only on the second end face among a tip of the projection and the second end face, and
the projection supports the lower outer face from below.

2. The vehicle door frame according to claim 1, wherein the lower member includes a closed sectional part, an upper wall, and a lower wall, the closed sectional part including a closed section crossing the longitudinal direction extending in the longitudinal direction, the upper wall extending in the longitudinal direction and forming a part of the closed sectional part, the lower wall extending in the longitudinal direction, forming a part of the closed sectional part, and facing the upper wall on the closed sectional part,
the upper wall forms at least a part of the second end face, and is juxtaposed to the upper sash in the longitudinal direction, and
the lower wall includes the projection.

3. The vehicle door frame according to claim 2, wherein the lower member includes an outer member and an inner member, the inner member that at least partially lies more inward than the outer member in a vehicle width direction and includes the upper wall and the lower wall,
the inner member includes the second end face, and
a longitudinal end of the outer member faces the first end face with a gap therebetween.

4. The vehicle door frame according to claim 1, wherein the projection includes a side edge that extends in a projecting direction of the projection, and
the lower member includes a cutout between the second end face and the side edge, the cutout being recessed from the second end face in a direction opposite to the projecting direction.

* * * * *